Oct. 27, 1964 J. G. MURGLIN 3,154,637

CODE GENERATING MECHANISM

Filed April 5, 1963 3 Sheets-Sheet 1

INVENTOR
JOSEPH G. MURGLIN

BY [signature]

ATTORNEY

Oct. 27, 1964 J. G. MURGLIN 3,154,637

CODE GENERATING MECHANISM

Filed April 5, 1963 3 Sheets-Sheet 2

Oct. 27, 1964 J. G. MURGLIN 3,154,637

CODE GENERATING MECHANISM

Filed April 5, 1963 3 Sheets-Sheet 3

3,154,637

CODE GENERATING MECHANISM

Joseph G. Murglin, Norridge, Ill., assignor to Teletype Corporation, Skokie, Ill., a corporation of Delaware Filed Apr. 5, 1963, Ser. No. 270,843
11 Claims. (Cl. 178—17)

This invention relates to a keyboard mechanism for printing telegraph apparatus and more particularly to a permutation keyboard mechanism for generating permutational code combinations.

Most presently employed telegraph apparatus operates with the five-unit or Baudot code wherein it is possible to have 32 different code combinations or permutations of two different conditions. This total number of permutations or combinations available in a given binary code is determined by the formula $2^n$ wherein "$n$" is the number of intelligence element signals or bits utilized in a code combination. The five-level or Baudot code does not provide a sufficient number of available code combinations for all the alphanumeric characters and hence to increase the intelligence conveying capability of this code resort has been made to mechanically shifting a receiving printer apparatus between a "letters" and a "figures" state so that the same code combination may be associated with two different characters or functions depending on the state (letters or figures) of the receiving apparatus.

The keyboard mechanism of most five-unit telegraph apparatus employs only three rows of keys rather than the four rows of keys employed in a typewriter and requires that the operator of the telegraph keyboard be trained to operate keys arranged in a different format and to depress the "letters" and "figures" keys at appropriate times when desired to shift the receiving apparatus to another state to cause it to function properly in response to a given code combination. Where it has been attempted to provide four rows of keys in a typewriter format and still employ the Baudot code, as in United States Patent No. 2,559,637, granted to A. A. Kirchel on July 10, 1951, two complete sets of five code bars have been employed.

Another alternative mode of transmission wherein an attempt was made to achieve a four-row typewriter keyboard format is in keyboard mechanisms that generate a sixth level "shift" code wherein it is possible to obtain 64 code combinations ($2^6$). In the six-level shift code, the lower case code combinations always have spacing condition in their sixth levels and the upper case code combinations differed from the lower case code combinations in that a marking condition is always present in the sixth level of the upper case code combinations. Thus, to generate upper case characters, it was only neces- to release a sixth level code bar upon operation of a shift key to generate an additional marking pulse so long as the shift key remained depressed.

With the advent of computers and the controlling thereof by telegraph apparatus and the increased demand for control features for computers other than the mere printing of alphanumeric characters, it became necessary to employ a new code having a greater number of permutative elements or bits. The code which is generated by the keyboard mechanism, to be described hereinafter, is such a code and is called a "data interchange code." The "data interchange code" is an eight level code having a start element, eight intelligence elements and a stop element. The start element and eight intelligence elements are each of one unit length and the stop pulse is of two units length making an eleven unit code combination. Although eight levels are available for character information, only the first seven intelligence elements are presently being utilized to convey intelligence and the eighth element is always transmitted as a marking element. The eighth element is presently unused, but is available for future expansion of the code and could be used as a parity check element. Since only seven bits or elements are utilized, the code provides $2^7$ or 128 code combinations for character information, 64 of which are assigned to printing alphanumeric characters or graphics and the remainder of which are assigned to either control functions or are not assigned to any character or function. As presently constituted, the code can best be described as a fifth level inversion code, since the depression of the shift key causes the signal element or bit in the fifth level to be converted from either marking to spacing condition, or alternatively, from a spacing to marking condition depending upon whether or not the element to be changed is marking or spacing when the shift key is not depressed.

In the "data interchange code" both lower and upper case code combinations may have either marking or spacing elements in their fifth levels whereas in the "sixth level shift code," the lower case code combinations always have spacing elements in their sixth levels and the upper case code combinations always have marking elements in their sixth levels. The present keyboard mechanism is similar to a "sixth level shift" keyboard mechanism in that concurrent depression of a "control" key and a key having a multi-letter, upper designation thereon results in the changing of a seventh level element from a marking condition to a spacing condition.

An object of the invention is to provide a simple and inexpensive keyboard mechanism capable of generating either marking or spacing elements in each level of the code combinations and capable of inverting the elements in one level upon depression of a predetermined key.

Another object of the invention is to provide a keyboard mechanism for generating distinctive upper and lower case code combinations by having a shift key selectively enable and disable code bars associated with a common level of the code combination for release with the remaining code bars in response to operation of a signal key.

A feature of the invention is an arrangement whereby a pair of code bars is associated with a given level of a permutational code and a bail is provided for enabling one of the pair of code bars while disabling the other of the code bars and vice versa.

In the preferred embodiment of the present invention depression of any key of the keyboard mechanism releases a unique combination of code bars that represent the code combination corresponding to the indicia on that key. An extra code bar called an inverted code bar has most of its wards permutatively encoded in an opposite manner to the encoding of the wards on a fifth level code bar and is normally restrained from movement by a depending finger of a bail overriding the code bars. Depression of the shift key causes its selector lever to shift a slidable bar to cam the overriding bail upwardly to enable the inverted code bar to be positioned by the subsequent depression of a key. This shift key will also block the fifth level code bar from release. An upstanding projection on each of the intelligence code bars operates a transfer lever which transfers the condition of its associate code bar to a bail that controls the electrical generation of the code elements. The inverted code bar and the fifth level code bar are associated with the same transfer lever so that one or the other will determine the nature of the fifth level code element, and since they are reversely encoded, they will generate elements of opposite or inverted conditions in this fifth level. Multi-letter control designations appear on upper positions of some keys and require a concurrent depression of a "control" key and a so designated key to obtain the desired control or function. The "control" key disables a normally enabled code bar in the seventh level to change the seventh level element from a "marking" to a "spacing" element to form a different code combination from that code combination generated by depression of the selected key without a concurrent operation of the "control" key.

These and other objects of the invention will become more apparent after reference to the following detailed description when considered in conjunction with the accompanying drawings wherein.

Figure 1:
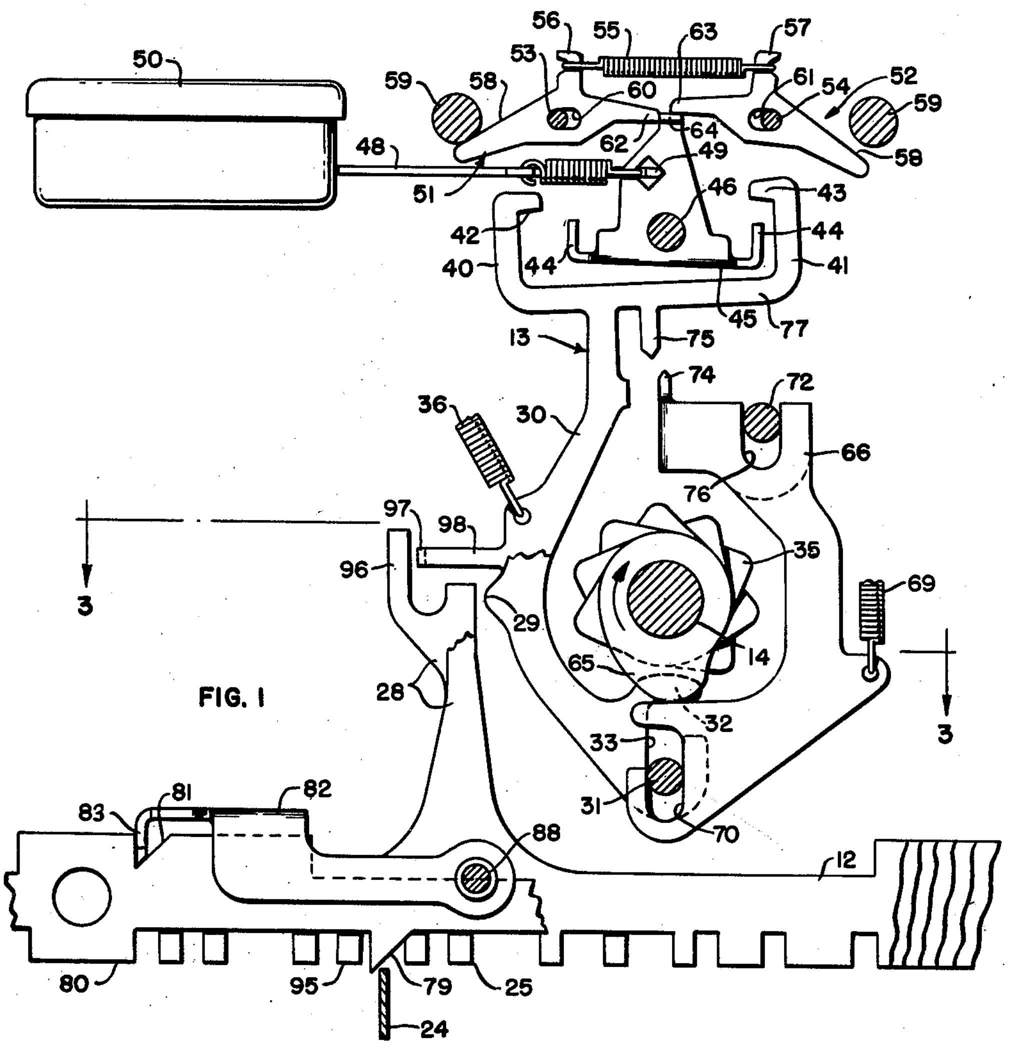
FIG. 1 is an elevational view of a signal generator used in conjunction with a keyboard transmitter of a printing telegraph apparatus and showing the mechanism for controlling the signal generator as a sectional view, partly broken away.

The keyboard mechanism employed in the present device has its keytops 1 (FIGS. 4 and 6) arranged in four rows in a format very similar to the four row format of keys of a typewriter, in that alphabetical keytops 2 are arranged in the same positions in the second, third and fourth rows as they are on a typewriter keyboard and in that the numerical keys 3 are arranged in the top row of keytops 1 as they are in a typewriter.

The format of the present keyboard is similar to that of a typewriter in that, when it is desired to generate a graphic character code combination associated with an upper designation 4 on a keytop 1 having a lower designation 5, a shift key 6 must be depressed prior to the actuation of a keytop 1 having an upper designation 4. The graphic characters appear as upper designations 4 on the numerical keys 3 and on some of the alphabetical keytops 2 such as the keytops 1 bearing alphabetical designations N, O, and P.

Unlike a typewriter, a teleprinter does not print the alphabetical characters A–Z both as small and capital letters, but prints them only as capital letters, this being in accordance with the usual practice in teletypewriters and printing telegraph apparatus. Thus, the alphabetical keytops 2 may be employed to generate code combinations for other purposes when a shift key 6 and an alphabetical key 2 are concurrently depressed. As seen above, the depression of a shift key and the simultaneous depression of one of the alphabetical keys 2 such as N, O, P generates a code combination for a graphic character other than an alphanumeric character.

The alphanumeric characters 2 also carry a number of multi-lettered, upper designations 4, such as WRU, EOT and TAB. These designations are abbreviations for words and phrases such as "Who are you," "End of transmission" and "Tabulation" which are associated with machine functions and for which there are no graphic printing symbols. To generate a code combination for one of these functions appearing as a multi-lettered upper designation 4 on any of the alphabetical keys 2, a control key 7 must be operated concurrently with the alphabetical key 2 having this multi-letter designation thereon. The code combinations for the graphic characters differ from the code combinations of their respective lower designations 5 in that the pulse in the fifth level is inverted from a marking to a spacing pulse or from a spacing to a marking pulse, respectively. The code combinations for the functional multi-lettered, upper designations 4 appearing on the alphabetical keys 2 differ from their respectively associated lower designations 5 in that the seventh level pulse of their associated alphabetical characters is changed from a spacing to a marking pulse.

Since depression of an alphabetical keytop 2 generates a capital letter rather than a lower case or smaller letter as in a typewriter and since it is not possible to generate a lower case or small letter in the usual teletypewriter as in a typewriter, a problem of nomenclature arises as to whether or not to define the graphic characters generated as upper and lower case characters. In the usual teleprinter, a "figures" or "shift" key causes generation of a "figures" code combination and there is provided a "letters" or "unshift" key to generate another distinct "letters" code combination to permit the utilization of identical code combinations in the "shift" case or "unshift" case. In the present keyboard mechanism, there is a separate and distinct code combination for each of the upper and lower designations of the keyboard and operation of the shift key does not generate a code combination. Also, there is no "letters" or "unshift" key for generation of another group designating code combination. The code combinations, however, are divided into groups by operation of the shift and control keys. In the absence of uniform terminology, hereinafter, those characters appearing as lower designations 5 on the keytops 1 will be called "lower case" characters; the graphics appearing as upper designations and obtainable after depression of the "shift" key 6 will be called "shift" or "upper case" characters; and the control functions designated by multi-letters on the alphabetical keytops 2 will be called "control" or "function" code combinations.

In the embodiment of the invention to be described hereinafter, the details of the telegraph keyboard transmitter which cooperate with the device according to the present invention, but which do not constitute a part of the combination comprising the invention, have not been shown in the drawings and will not be described herein since the keyboard transmitter is shown and described in United States Patent No. 2,607,848, granted August 19, 1952, to W. J. Zenner, and since the signal generator unit employed in the keyboard transmitter of said patent is described in United States Patent No. 2,963,545, granted December 6, 1960, to A. Z. Purzycki. The disclosures of these patents are incorporated herein by reference and made a part hereof as if fully disclosed herein.

Figure 3:
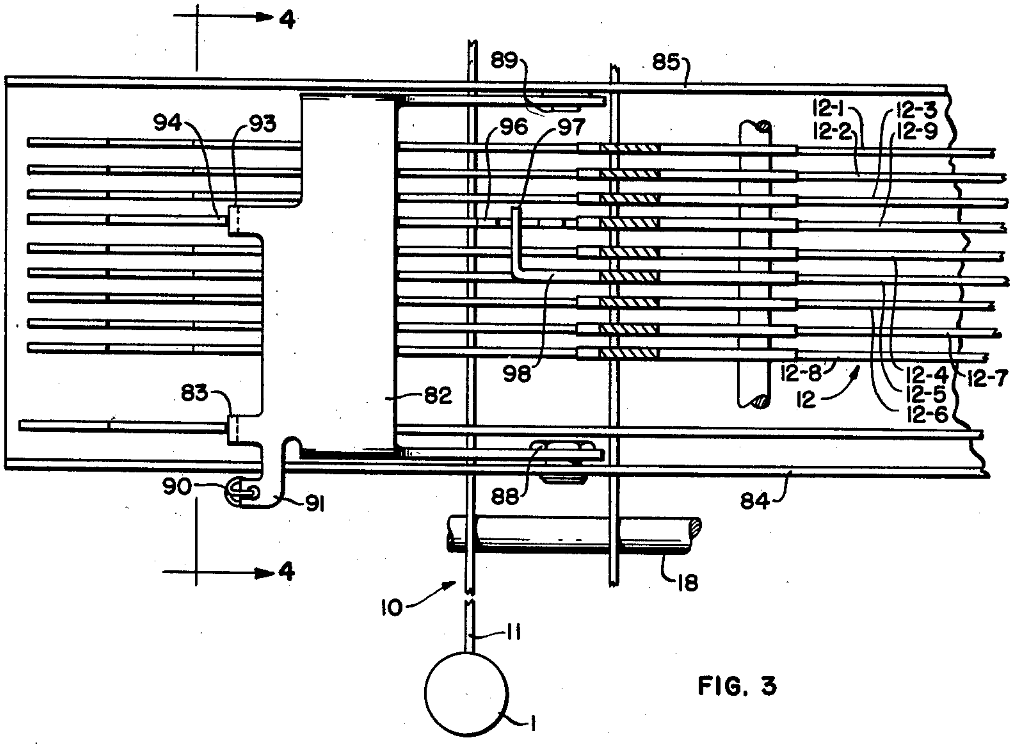
FIG. 3 is a sectional view taken substantially along the line 3—3 in FIG. 1 in the direction of the arrows showing the arrangement of the code bars used in the keyboard controlled transmitter.
Figure 4:
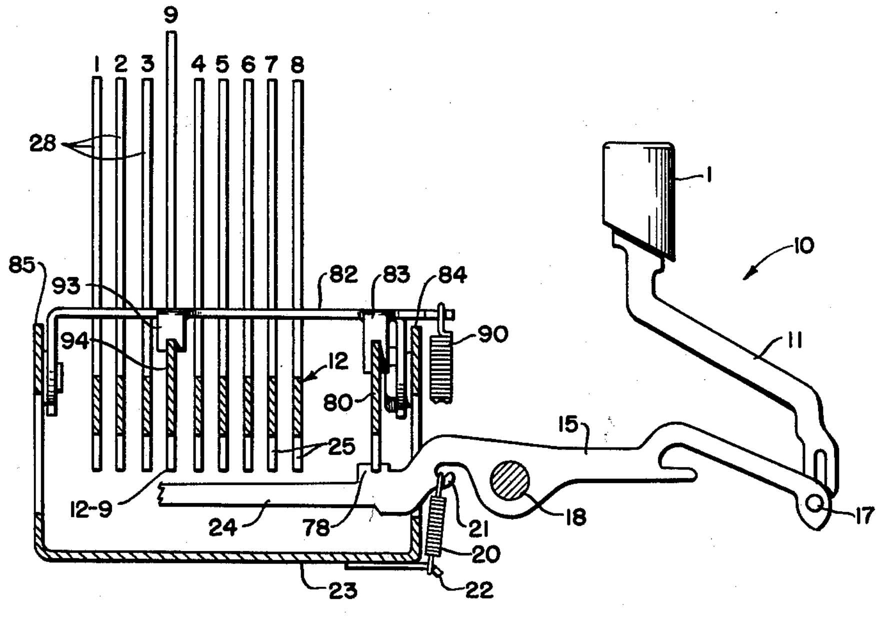
FIG. 4 is a sectional view taken along the line 4—4 in FIG. 3 in the direction of the arrows showing the relationship of a key stem, a selector lever and the code bars.

Briefly, the keyboard transmitter employing the present device, according to the present invention, has the usual base and a keyboard for housing rows of key levers 10, only one of which is shown in FIGS. 3 and 4. The key levers 10 cause operation of a selector mechanism which is exemplified by code bars 12 and which controls the signal generator 13 (FIG. 1) that generates sequential electrical telegraph signals. A motor (not shown) for supplying the power for operating the keyboard transmitter is mounted on the base in position to effect the cyclic rotation of an operating shaft 14 and the resetting of the code bars 12.

Referring now to FIGS. 3 and 4, the key levers 10 are shown having keytops 1 connected to key stems 11 which are articulated to selector levers 15. Upon depression of a key lever 10, the key stem 11 will move downwardly within the keyboard and, through its articulation 17 with the selector lever 15, will rock selector lever 15 about a fixed pivot rod 18 in a clockwise direction as seen in FIG. 4. Each of the selector levers 15 is biased in a counterclockwise direction by a contractile spring 20 secured between a hook 21 on the selector lever 15 and a spring carrier 22 fastened to a lower frame member 23. The contractile springs 20 thus bias the selector levers 15 into the position shown in FIG. 4 wherein the blocking portion 24 of the selector lever is situated beneath and out of interference with the path of transverse movement of dependent wards 25 on the code bars 12. Also, the key stem 11 and keytop 1 are biased and maintained in an upward position until depressed by an operator.

As set forth in Patent No. 2,607,848, the code bars 12 are normally biased rightwardly (FIGS. 1 and 3) by individual springs (not shown), and are held in their leftward position by a reset bail (similar to bail member 48 disclosed in said patent) which bears against shouldered portions on the code bars 12. This bail member retains the code bars 12 against rightward movement (FIGS. 1 and 3) under the influence of their individual springs until one of the keys is depressed and causes the reset bail to move and to release the code bars 12 for rightward movement, as more fully disclosed in said patent.

Each of the code bars 12 is provided with a vertically projecting portion 28, and the upper end of each code bar 12 is adapted to cooperate in abutting relation with a projection 29 on a transfer lever 30. The transfer lever 30 has a slot 33 in its lower end by means of which it is slidable and pivoted on a pivot shaft 31. The transfer levers 30 each have a cam follower portion 32 located beneath and associated with one of a plurality of helically arranged transmitting cams 35. The transfer levers 30 are normally biased upwardly and in a counterclockwise direction by springs 36 individual to each of the transfer levers so that the bottom of the groove 33 is normally in engagement with the pivot shaft 31 thereby limiting the upward movement of the transfer levers 30. The transmitting cams 35 are helically arranged around the shaft 14 to effect sequential operation of their associated transfer levers 30. As a transmitting cam 35 engages a cooperating cam follower 32 and reciprocates its associated transfer lever 30 downwardly, the slot 33 allows the transfer lever 30 to move downwardly with respect to the shaft 31.

The transfer lever 30 will be rocked clockwise (FIG. 1) if its code bar 12 has moved portion 28 to the right to actuate the projection 29 and will remain in the counterclockwise position if its code bar 12 has not moved to the right. Each of the transfer levers 30 is provided, at its upper end, with a pair of arms 40 and 41. The arms 40 and 41 have inwardly directed and confronting abutment portions 42 and 43, respectively, that are adapted to overhang one of a pair of upwardly directed flange abutments 44 on a transfer bail 45.

The transfer bail 45 is intermittently rocked, either in a clockwise direction by an abutment 43 on a transfer lever 40 or in the counterclockwise direction by an abutment portion 42, by the sequentially operated transfer lever 30, to control transmitting contacts (not shown) in a contact box 50. The transfer bail 45 is articulated to a link 48 by an articulate connection 49. The link 48 operates a transmitting contact mechanism which is preferably of the type shown in United States Patent No. 2,605,366, granted July 29, 1952, to W. J. Zenner.

To stabilize the transfer bail 45 and its attached link 48 in a given position so that the contacts within the contact box 50 remain closed and do not bounce or chatter, a pair of stabilizing slides 51 and 52 are supported on studs 53 and 54, respectively, and are biased toward one another by a contractile spring 55 secured between upward hooks 56 and 57, respectively, on each of the slides 51 and 52, respectively. The stabilizer slides 51 and 52 are guided in their paths of movement by sloped camming surfaces 58 formed thereon which are adapted to slide along fixed posts 59, and are guided by slotted portions 60 and 61 sliding along their pivot studs 53 and 54, respectively. The slides 51 and 52 have confronting ends 62 and 63 which are alternatively in engagement with a laterally directed flange 64 on the transfer bail 45. For example, when slide 51 has its end 62 in engagement with the laterally directed flange 64 of the transfer bail 45 and the transfer bail 45 is rotated in a counterclockwise direction as seen in FIG. 1, the laterally directed flange 64 will force the stabilizer slide 51 to the left and as the camming surface 58 slides against the post 59 the confronting end 62 of stabilizer slide 51 will rock upwardly and move over the top of the laterally directed flange 63 while the opposed stabilizing slide 52 will have dropped its end 63 downwardly and into engagement with the lateral flange 64 to maintain the transfer bail 45 in its counterclockwise position.

The transfer levers 30 are unlocked in their rightward or leftward positions at the beginning of a signal generating cycle until a cam lobe 65 holding a locking lever 66 in its downward position rotates in a clockwise direction and permits the locking lever 66 to move upwardly under the influence of a contractile spring 69. The locking lever 66 is guided by its slotted portions 70 and 76 sliding along guide posts 31 and 72, respectively.

The locking lever 66 has a pointed blade 74 at its upper extremity which is adapted to be lifted upwardly and adjacent to dependent pointed blades 75 on each of the transfer levers 30 to prevent rotation of a transfer lever 30 during a transmission cycle. Thus, it should be apparent that as each of the released code bars 12 moves its vertical projecting portion 28 rightwardly against projection 29 and thereby moves its respective transfer lever 30 rightwardly, these transfer levers will have placed their pointed blades 75 rightwardly of the pointed blade 74 on the locking lever 66 so that these transfer levers 30 will be locked in this position until the cam lobe 65 on the operating shaft 14 again retracts the locking lever 66 and its pointed blade 74 at the end of a transmitting cycle. Of course, those of the transfer levers 30 that were not rocked clockwise will be positioned in the spacing condition, shown in FIG. 1, and hence the pointed blade 74 on the locking lever 66 will be positioned rightwardly of the pointed blade on these transfer levers 30 locking them in this position. There is, of course, sufficient clearance between the horizontal web 77 of the transfer lever 30 and the pointed blade 74 on the locking lever so that the transfer levers 30 may be reciprocated while the blade 74 is in its upward locking position.

The description hereinbefore has been directed to the normal prior art keyboard arrangement commonly found in printing telegraph apparatus manufactured by Teletype Corporation which may be better understood by reference to Bulletin 249B published by Teletype Corporation. The above-identified bulletin describes the prior art type of keyboard for generating the commonly used Baudot code or five-level code and the following descriptive matter will cover the necessary changes in this type of keyboard for generating the "data interchange code."

Figures 5, 6:
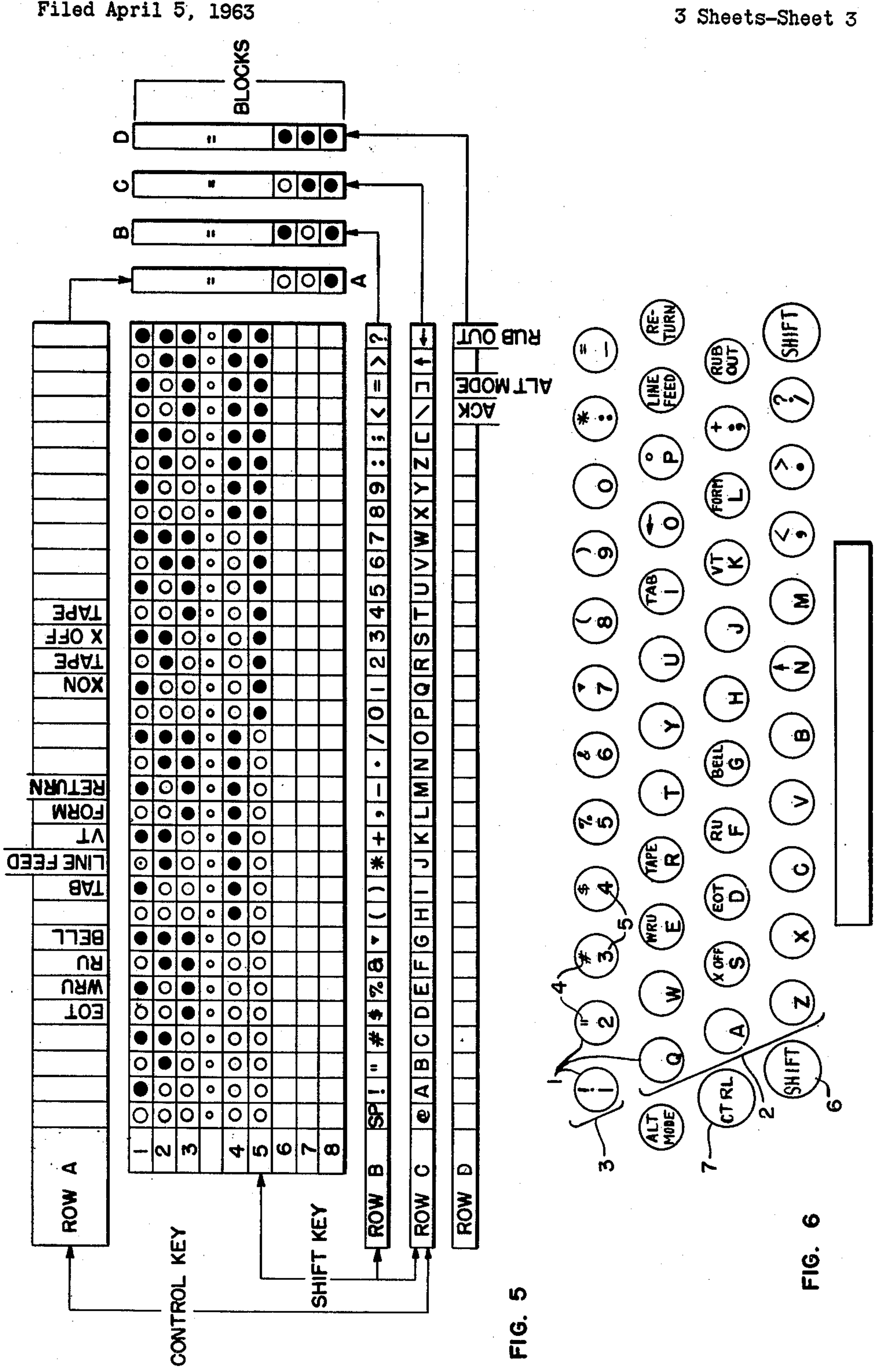
FIG. 5 is a diagrammatic view of the data interchange code as presently contemplated for generation by the keyboard control transmitter.
FIG. 6 is a diagrammatic view of the keytop arrangement of the keyboard of the keyboard mechanism.

The data interchange code is shown diagrammatically in FIG. 5 in the form that a perforated tape would take if encoded with this code. The light circles represent spacing elements and the dark circles represent marking elements that would appear in a tape as perforations therein. As laid out in FIG. 5, there are four rows of designations that appear on the keytops of FIG. 6, viz. rows A, B, C and D. Each of the code combinations for rows A, B and D have the same first five elements as row C (alphabetics) and differ only in the elements in the sixth, seventh and eighth levels which are shown separately in the right portion of FIG. 5.

Row A contains all of the functions or control designations which appear in multiletter form in the upper position on the alphabetical keytops 2. For example, the designation WRU in row A is aligned with the designation E in row C and its code combination differs from the code combination for the character E only in that its seventh level element is a spacing element whereas the seventh level element of the character E is a marking element.

Row B contains the numerical characters and the signs which are the upper case characters on the numerical keytops 3, for example, the exclamation point (!), the quotation mark (") and number sign (#) which are upper case characters on the first three numerical keytops 3. The characters in row B are printed graphic characters unlike the functional characters of row A. Row C contains the alphabetical characters and row D is largely unused except for three exceptions, namely, acknowledge, rub-out and alternate mode, all of which have marking elements in their sixth, seventh and eighth levels.

It should be noted that row B contains both upper and lower case characters. For example, the lower case numeral 4 and the dollar sign ($) are both in row B and the only difference in the fifth level of their respective code combinations is that the numeral 4 has a marking element whereas the dollar sign ($) has spacing element.

The code bars generally designated by the numeral 12 include eight code bars 12–1 to 12–8 for generating lower case code combinations and a ninth or inverted code bar 12-9 for providing a fifth level element for the upper case code combination in lieu of the fifth level element generated by the fifth level code bar 12–5, which code bar is disabled during generation of an upper case code combination. The code bar 12–9 is normally blocked or disabled from release while printing in the lower case and the lower case and conversely, when printing in the upper the code bar 12-5 is enabled for release while printing in case, code bar 12–5 will be disabled or blocked from release and code bar 12–9 enabled or conditioned for release. Since the code bar 12–9 is encoded with wards 25 in the reverse order to that in which the code bar 12–5 is encoded, it should be apparent that the only difference between a lower case and upper case character is that their fifth level elements are of opposite conditions, i.e., marking condition in one and spacing condition in the other and vice versa.

It will be remembered that the control function code combination of row A differs from their associated alphabetical code combinations in that the seventh level of the alphabetical code combinations have a marking element whereas the seventh level of the control code combination has a spacing element. A multiletter function code combination of row A is generated by first depressing a control key 7 and concurrently depressing an alphabetical key 3 having a multiletter control designation thereon. Operation of the control key 7 causes its selector lever 15 to move upwardly adjacent a ward 25 on the code bar 12–7 to prevent the movement of the code bar 12–7 to the marking position. Hence, so long as the control key 7 is depressed, the code bar 12–7 will be disabled from moving rightwardly to a marking position and the signal generator will generate a spacing element in the seventh level. Thus, the operation of control key 7 and concurrent operation of a multiletter function key such as that having the designation WRU thereon causes the release of the code bars 12–1 to 12–8 and any of the code bars 12–1, 12–2, 12–3, 12–4, 12–5, 12–6 and 12–8 may move to the right to a marking position while code bar 12–7 is blocked from movement to the marking position.

Figure 2:
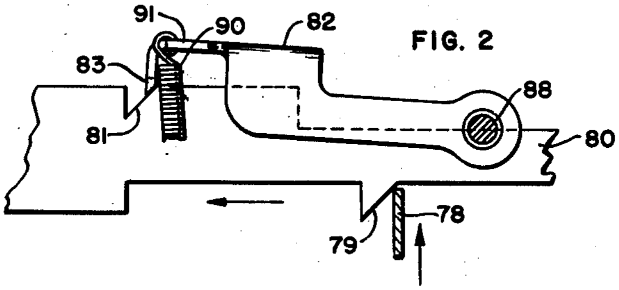
FIG. 2 is an enlarged fragmentary view showing a bail overriding the code bars.

Depression of the shift key 6, as shown in FIG. 4, moves the key stem 11 downwardly and through an articulation 17 rocks selector lever 15 in a clockwise direction about the pivot rod 18 against the urging of contractile spring 20. Upward movement of the left end (FIG. 4) of the selector lever 15 brings camming projection 78 on the selector lever 15 into engagement with an inclined cam 79 on a longitudinal slidable bar 80. As best seen in FIGS. 1 and 2 the slidable bar 80 has an inclined camming surface 81 in its upper edge and as the slidable bar 80 is driven leftwardly as viewed in these figures, the inclined camming surface 81 cams a bail 82 upwardly in a clockwise direction as the camming surface 81 moves leftwardly across a downwardly turned portion 83 of bail 82. The bail 82 is pivotally mounted to a pair of outer frame members 84 and 85 (FIGS. 3 and 4) by a pair of pivot pins 88 and 89, respectively, and is biased in a downwardly and counterclockwise direction by a contractile spring 90 hooked to a tab 91 on the bail 82. As apparent from the drawings, bail 82 spans all of the code bars 12–1 to 12–9 and has a downwardly turned finger 93 in blocking engagement with a vertical projection 94 on the upstanding code bar 12–9.

When the selector lever 15 is operated by the shift key and moves in a clockwise direction, it causes the bail 82 to rise and lift finger 93 out of its blocking position with respect to the vertical projection on the code bar 12–9. The code bar 12–9 does not immediately release, since it is still held by the reset bail (not shown) as are the other code bars 12–1 to 12–8. The code bar 12–9 is thus conditioned for release and will remain conditioned for release until one of the keys 10 is depressed on the keyboard.

Depression of a given key lever 10 on the keyboard having an upper case designation thereon will cause its associated selector lever 15 to move its blocking portion 24 upwardly into the path of movement of the wards 25 of the code bars 12–1 to 12–9. Those of the code bars having a ward 25 positioned adjacent the blocking portion 24 of the operated selector lever 15 will move slightly upon release to bring their wards 25 into engagement with the blocking portion 24 and those of the code bars not having a ward 25 adjacent the blocking portion 24 will be permited to move rightwardly. The code bar 12-5 cannot move rightwardly since it is the only code bar that has a ward 25 that is positioned adjacent the blocking portion 24 of the selecting lever 15 of the shift key. This ward is designated by the numeral 95 in FIG. 1. So long as the shift key 6 remains depressed, the blocking portion 24 of its selecting lever 15 will be in blocking relationship to the ward 95 on the code bar 12–5 blocking it against movement.

Since the code bar 12–5 is disabled from moving rightwardly and hence cannot control its associated transfer lever 30, the transfer lever 30 in the fifth level is now available for actuation by the code bar 12–9. The code bar 12–9 has an upward projection 28 thereon like the upward projection on the code bars 12–1 to 12–8 for operating the start-stop transfer lever 30 and additionally has an upwardly directed projection 96 adapted for engagement with a horizontally turned portion 97 on a rearward extension 98 on the fifth-level transfer lever 30 normally associated with the code bar 12–5. When a key 10 is depressed after operation of the shift key 6, and the code bar 12–9 does not have a ward 25 thereon adjacent to the blocking portion of the operated selector lever 15, the code bar 12–9 is released for rightward movement to bring its projection 96 into engagement with the horizontally turned portion 97 on the transfer lever 30 associated with the fifth level. It should be remembered that if the shift key 6 had not been depressed and the same key had been depressed while the keyboard was in the lower case position, the code bar 12–5 would not have released but would have been blocked from rightward movement by a downwardly directed ward 25 adjacent the depressed selector lever 15 and hence the condition of the element in the fifth level of the code would be the reverse of that afforded with the shift key 6 depressed.

To afford a better understanding of the invention a detailed description of an operation is presented hereinafter. When the shift key 6 is not operated, operation of a key lever 10 will pivot its associated selector lever 15 in a clockwise direction to raise its blocking portion 24 into blocking relationship with the code bars 12–1 to 12–9. Upon release of the reset bail (not shown), code bars 12–1 to 12–9 are leased for rightward movement under the bias of their springs. The code bar 12–9 moves only slightly before its projection 94 engages the downwardly turned finger 93 on the bail 82 and is thus prevented from moving rightward, this is true even if code bar 12–9 did not have a ward 25 adjacent the blocking portion 24 of the depressed selecting lever 15. Thus, the projection 96 on the code bar 12–9 is prevented from coming into contact with the horizontally turned portion 97 on the transfer lever 30 in the fifth level and this transfer lever 30 in the fifth level is free for operation by the code bar 12–5. If there is no ward 25 on code bar 12–5 adjacent the blocking portion 24 of the operated selector lever 15, the code bar 12–5 will move rightwardly to bring its vertical projecting portion 28 into the path of the projection 29 on the transfer lever 30 and will cause the transfer lever 30 to rock in a clockwise direction about pivot shaft 31 when the lever 30 is driven downwardly by its cam 35.

Operation of the selecting lever 15 also causes the clutch for shaft 14 to be tripped in the well known manner to begin the rotation of the operating shaft 14 whereupon the cam lobe 65 moves in a clockwise direction permitting locking lever 66 to move upwardly under the urging of spring 69. Upward movement of the locking lever 66 positions pointed blade 74 upwardly in blocking relationship with the pointed blades 75 on the transfer levers 30 thereby locking the transfer levers 30 in the permutative positions they have assumed after movement by the code bars 12–1 to 12–8.

The generation of the sequential electrical signals representative of the parallel permutational combinational setting of the transfer levers 30 and the code bars 12 will now begin as the first transmitting cam 35 engages the cam follower portion 32 on the transfer lever 30 associated with the first level of the code combination. It will drive this transfer lever downwardly and cause whichever one of the abutment portions 41 or 43 that is overlying its associated flange abutment 44 to engage and rotate the transfer bail 45 about its pivot shaft 46 and through link 48 to set the transmitting contact within contact box 50.

For example, if the key for the numeral "4" had been depressed, it would have generated the following intelligence elements, space, space, mark, space, mark, mark, space, mark. Since the fifth element for the character "4" is in the marking condition, the code bar 12–5 will be permitted to move rightwardly to rock the transfer lever 30 associated with the fifth level in a clockwise direction to position abutment portion 42 over the flange abutment 44 to rock the transfer bail 45 in a counterclockwise direction and move the link 48 leftwardly to position the transmitting contacts within the box 50 in a marking condition.

If it is desired to generate the code combination for the dollar sign ($) which is the upper case character designation appearing on the same keytop 1 as the lower case character "4," the shift key 6 must be depressed to rock its selecting lever 15 in a clockwise direction to bring its camming projection 78 upwardly into camming engagement with the inclined camming surface 79 on the slidable bar 80 to slide the bar 80 to the left. As the bar 80 is moved to the left, its inclined camming surface 81 forces the downwardly turned portion 83 of the bail 82 upwardly and in a clockwise direction about its pivot pins 88 and 89. As the bail 82 moves upwardly, it lifts dependent finger 93 out of the path of movement of the projection 94 on the code bar 12–9 thereby conditioning or enabling the code bar 12–9 for release upon the tripping of the reset bail (not shown) by the depression of the key for the numeral "4." As the code bar 12–9 was being enabled by the shift key's selector lever 15, this selector lever 15 was also disabling code bar 12–5 by moving its blocking portion 24 upwardly into blocking relationship with the ward 95 on the code bar 12–5 so that when the reset bail is tripped the cod bar 12–5 can move only slightly to bring the ward 95 into blocking engagement with the blocking portion 24 of the selecting lever 15 associated with the shift key.

Since the permutation code arrangement of the dollar sign "$" is space, space, mark, space, space, mark, space, mark, it will be seen that the permutation code combinations for the numeral "4" and the "$" differ in that their fifth level elements are inverted.

Upon depression of the key lever 10 associated with the "$," the enabled code bar 12–9 will begin to move rightwardly and bring its ward 25 into engagement with the blocking portion 24 on the selecting lever associated with the key designated by the "$." Thus, the blocking portion 24 prevents movement of the code bar 12–9 to the right and hence prevents projection 96 from engaging the turned portion 97 on the transfer lever 30 that would otherwise move this transfer lever 30 to the marking position. Thus, when the locking lever 66 moves upwardly and brings the pointed blade 74 into blocking engagement with the dependent blade 75 on the transfer lever 30 in the fifth level, this pointed blade 75 will be positioned to the left of the pointed blade 74 in the locking lever 66. Therefore, upon the downward movement of the fifth level transfer lever 30 by its transmitting cam 35, the abutment portion 43 will engage the abutment flange 44 and transfer bail 45 to pivot the transfer bail 45 clockwise above pivot shaft 46 and thereby move the link 48 to the right to position the transmitting contact in the spacing position. The stabilizing slide 51 will then be in a position shown in FIG. 1 holding the transfer bail 45 in this clockwise or spacing position until moved therefrom by a transfer lever 30 positioned in accordance with a marking condition.

From the foregoing, it should be apparent that the keyboard transmitter constitutes a code generating means for generating permutation code combinations by means of a plurality of settable means or code bars 12–1 to 12–9 which are movable between two positions to indicate the binary condition of an associated element of the code. Also, it should be apparent that the code bar 12–5 constitutes a first settable means normally enabled for movement between two positions to form, with the normally settable code bars 12–1, –2, –3, –4, –6, –7 and –8, a lower case code combination and that the second settable means or code bar 12–9 is normally disabled from movement, but upon being enabled is able to form a code combination with said normally settable code bars 12–1, –2, –3, –4, –6, –7 and –8 differing in the fifth level from that of the code combination of an associated lower case character.

Finally, it should be apparent that the selecting lever 15 associated with the shift key 6 and the bail 82 constitute a means operable to block or disable the settable code bar 12–5 and to enable the code bar 12–9 or vice-versa.

Although only one embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:

1. In a keyboard mechanism for generating permutation code signal representations divided into upper and lower case code combinations wherein the lower case code combinations and upper case code combinations differ only in that the code element in one level of the upper case code combination is of a reversed condition from that in the same level of the lower case code combination.

(*a*) a plurality of signal key means for selective operation to generate code combinations, a portion of said plurality of signal key means being selectively operated to generate either upper or lower case code combinations, said portion of said signal key means being individually identified with both an upper and a lower case character, (*b*) a plurality of permutation means for generating either a marking or a spacing element for either upper or lower case characters, each of said permutation means being individual to a single level of the permutation code and being selectively operated by said signal key means, and (c) shiftable means for causing one of said permutation means in said one level to generate either a marking element instead of a spacing element or a spacing element instead of a marking element when said shiftable means has been operated depending on which element said permutation means would have generated had said shiftable means not been operated.

2. In a keyboard mechanism for generating individual code combinations distinctive of each of the upper and lower case designations on a key of the keyboard, the following:

(a) a plurality of settable means positionable in either of two positions in response to operation of a code combination generating key for generating lower case code combinations and a portion of the upper case code combinations, each of said settable means being individual to a single level of the code combination, (b) an additional settable means positioned in either of two positions in response to depression of an upper case key, said additional settable means associated with one level of a code combination with which one of said plurality of said settable means is associated, and (c) shift means for normally disabling said additional settable means and for disabling said one of said plurality of settable means and for enabling said additional settable means to cooperate with the remainder of said settable means to generate the upper case code combinations.

3. The keyboard mechanism of claim 2 including control means for positioning one of said plurality of settable means in one position when generating control combinations which differ from said upper and lower case code combinations in that said control combinations are not associated with graphic symbols.

4. In a keyboard mechanism for generating marking and spacing elements to form individual code combinations of a permutational code distinctive of the upper and lower case designations on a key of the keyboard, the following:

(a) First code bar means for causing the generation of marking and spacing elements in associated levels of the code for both the upper and lower case code combinations, (b) second code bar means for causing generation of marking and spacing elements in a level of the code to form lower case code combinations with the elements generated by said first code bar means in the remaining levels of the code, (c) third code bar means for causing the generation of marking and spacing elements in the same level of the code as said second code bar means, and to form upper case code combinations with said marking and spacing elements generated by said first code bar means, and (d) shift means for normally disabling said third code bar means and for enabling said second code bar means, said shift means operable for disabling said second code bar means and for enabling said third code bar means whereby said first code bar means and said third code bar means generate upper case code combinations.

5. In a keyboard mechanism for generating a permutation code having upper and lower case code combinations wherein the lower case code combination and upper case code combinations differ only in that the code element in one level of the code combination is of a reversed condition from that in the same level of an associated other case code combination, (a) a plurality of signal key means, a portion of said signal key means for generating either an upper or a lower case code combination, said portion of said signal key means being individually identified with both an upper and a lower case code combination, (b) a set of first code bar means releasable to move between first and second positions to indicate first or second conditions of a code element, (c) a second code bar means for causing the generation of an element of the lower case code combination, said set of first code bar means and said second code bar means generating all of said lower case code combinations, (d) third code bar means releasable for causing the generation of an element of the upper case code combinations, said set of first code bar means and said third code bar means generating said upper case code combinations, (e) a bail means for normally disabling said third code bar means from release and operable to enable said third code bar means and to disable said second code bar means, and (f) shift key means for operating said bail means to enable said third code bar means and to disable said second code bar means, whereby upon depression of a signal key means having an upper case designation thereon said set of first code bar means and said third code bar means are released to generate the designated upper case code combination.

6. In a keyboard mechanism capable of generating a permutational code divided into upper and lower case code combinations wherein the lower case code combinations and upper case code combinations differ only in that the code element in one level of the code combination is of a reversed condition from that in the same level of the other case code combination, (a) a plurality of signal key means for generating code combinations, a portion of said signal key means generating either upper or lower case code combinations, and said portion of said signal key means being individually identified with both an upper and a lower case code combination, (b) a set of first code bar means releasable by said signal key means to move to a position indicative of one of the two conditions of a code element, said set of first code bar means causing generation of elements for both upper and lower case code combinations, (c) a second code bar means for causing the generation of an element of a lower case code combination, said set of first code bar means and said second code bar means generating the elements of said lower case code combinations, (d) third code bar means releasable for causing the generation of an element of the upper case code combinations, said set of first code bar means and said third code bar means generating said upper case code combinations, (e) a bail means for normally disabling said third code bar means from release and operable for enabling said third code bar means and for disabling said second code bar means, (f) shift key means for operating said bail means to enable said third code bar means for release and to disable said second code bar means from release, whereby depression of a signal key means having an upper case designation thereon releases said set of first code bar means and said third code bar means to generate the designated upper case code combination, (g) a plurality of transfer means for transferring the selective movements of said code bar means and operable by said code bar means, one of said transfer means operable by and associated with each of the code bar means of said set of first code bar means and one of said transfer means operable by and common to said second and third transfer means, and (h) a utilization means for utilizing the selective positioning of said transfer means.

7. In a keyboard mechanism capable of generating a permutational code divided into upper and lower case code combinations wherein the lower case code combinations and upper case code combinations differ only in that the code element in one level of the code combination is of a reversed condition from that in the same level of the other case code combination, (a) a plurality of signal key means for selective operation to cause the generation of code combinations, a portion of said signal key means generating either an upper or a lower case code combination, and said portion of said signal key means being individually identified with both an upper and a lower case code combination, (b) a set of releasable code bars releasable for movement unless blocked from movement by one of said signal key means and thereby indicating a first condition of a code element and movable to a second position when not blocked by a signal key means to indicate an opposite condition, a first code bar of said set of code bar means being normally disabled, (c) a pivotable bail means for normally disabling said first code bar means to prevent its release to said second position, said bail means also operable to disable a second code bar of said set of code bar means from movement to said second position, (d) encoding means on each of said code bars for movement into blocking relationship with predetermined ones of said signal key means when one of said predetermined signal key means has been operated, said encoding means on said first and second code bars being reversed so that an operated signal key means will block one of said first and second code bars and not block the other of said first and second code bar means, (e) shift key means for operating said bail means to enable said first code bar for release and for disabling said second code bar from release, (f) transfer means for operation by said set of code bars, said first and second code bars associated with the same transfer means and the remaining of said set of code bars individually associated with a transfer means, and (g) signal generating means for generating sequential electrical signals, said signal generating means receiving selected inputs from said transfer means indicative of the positions of said set of code bars and generating electrical signals of a first or second condition corresponding to the positions of the set of code bars.

8. The keyboard mechanism of claim 7, wherein said shift means includes, (h) a shift key operable from said keyboard, (i) lever means operable by said shift key, (j) slidable means movable by said lever means, and (k) camming means on said slidable means for pivoting said bail to enable said first code bar and to disable said second code bar.

9. In a keyboard mechanism for generating permutation code combinations divided into upper and lower case code combinations wherein the code combinations for the upper case and lower case differ only in that the code element in one level of the upper case combination is in an opposite condition from that in the corresponding level of the lower case combination, (a) a plurality of code bars permutatively settable to represent both upper case and lower case code combinations, (b) key controlled means operable to control the permutative setting of said code bars to represent a predetermined code combination in which the code element in said one level is one condition, (c) at least one more key controlled means operable to control the permutative setting of said code bars to represent one more predetermined code combination in which the code element in said one level is in the opposite condition, and (d) shift means operable to cause the reversal of the condition of the code element from the condition it would be set to by either of the key controlled means.

10. The keyboard mechanism of claim 5, having a control key for positioning one of said set of first code bar means in its first position when generating control combinations, each of which combinations have in one of their levels a reversed condition from that element in the same level of associated lower case code combinations.

11. In a keyboard mechanism for generating permutation code representations of alphanumeric characters some of which characters are lower case and the remainder of which are upper case wherein the representation of certain lower case characters and the representation of associated upper case characters differ only in that one level of the permutation code representations of the certain lower case characters is of a reversed condition from the same level of the permutation code representations for the associated upper case code combinations;

(a) a code bar for each level of the permutation code representation normally held in a spacing condition and releasable to a marking condition;

(b) an additional code bar for one level of the permutation code representation normally held in a spacing condition and releasable to a marking condition;

(c) a plurality of keytops operative upon actuation for causing the release of all of the code bars and for blocking the movement of selected ones of the code bars from movement to the marking condition;

(d) a bail for normally holding the additional code bar from moving to the marking condition when keytops cause the release of the code bars; and (e) a case shift key for moving the bail so that the additional code bar may move to the marking condition when the keytops cause the release of the code bars and for blocking, from movement to the marking condition, the code bar associated with the same level of the permutation code representation as the additional code bar.

References Cited in the file of this patent

UNITED STATES PATENTS

Re. 20,330 Morton ---------------- Apr. 13, 1937

Dedication 3,154,637.—*Joseph G. Murglin*, Norridge, Ill. CODE GENERATING MECHANISM. Patent dated Oct. 27, 1964. Dedication filed Aug. 20, 1969, by the assignee, *Teletype Corporation*.

Hereby dedicates to the People of the United States the entire term of said patent.

[*Official Gazette December 9, 1969.*]